US005562337A

United States Patent [19]

Takinami et al.

[11] Patent Number: 5,562,337

[45] Date of Patent: Oct. 8, 1996

[54] VEHICULAR LAMP HAVING IMPROVED AIR VENT STRUCTURE

[75] Inventors: Seigo Takinami; Toshiyasu Mochizuki, both of Shizuoka, Japan

[73] Assignee: Koito Manufacturing Co., Ltd., Tokyo, Japan

[21] Appl. No.: 395,696

[22] Filed: Feb. 28, 1995

[30] Foreign Application Priority Data

Mar. 1, 1994 [JP] Japan .................................. 6-054370

[51] Int. Cl.$^{6}$ .................................................. B60Q 1/04

[52] U.S. Cl. ........................................ 362/61; 362/294

[58] Field of Search ............................ 362/61, 74, 294, 362/345, 373

[56] References Cited

U.S. PATENT DOCUMENTS 4,555,748 11/1985 Bradley ............................ 362/294 X
5,010,453 4/1991 Ketterman ............................ 362/61
5,367,438 11/1994 Deslandres ........................ 362/294 X

FOREIGN PATENT DOCUMENTS 2695455 3/1994 France .
57-106117 of 1982 Japan .
63-167602 11/1988 Japan .
2237626 5/1991 United Kingdom .

*Primary Examiner*—Stephen F. Husar
*Attorney, Agent, or Firm*—Sughrue, Mion, Zinn, Macpeak & Seas

[57] ABSTRACT

A vehicular lamp having an air vent structure of reduced size and with which the airtightness of a lamp housing can easily be tested. An integrally formed tubular wall projects rearward from a rear wall of a lamp body. The rear edge of the tubular wall is inclined downward in a forward direction, and its outward edge lies in a single plane inclined downward in the forward direction. A communicating hole through which the interior and exterior of a lamp housing are communicated is formed in a portion of the rear wall which is surrounded by the tubular wall.

8 Claims, 7 Drawing Sheets

VEHICULAR LAMP HAVING IMPROVED AIR VENT STRUCTURE

BACKGROUND OF THE INVENTION

The present invention relates to a vehicular lamp, and more particularly to a vehicular lamp having an improved air vent structure through which the interior of the lamp housing is communicated with outside air. Particularly, the invention provides a vehicular lamp in which such an air vent structure can be produced in a reduced size and the airtightness of the lamp housing can easily be tested.

A vehicular lamp is provided with an air vent structure in order to equalize any differences in pressure between the interior lamp housing and the atmosphere caused, for instance, by a temperature rise inside the lamp housing when the lamp is lit or by a temperature drop when the lamp is extinguished.

FIG. 15 shows an example of a conventional air vent structure. In FIG. 15, a designates a lamp body from which a pipe b integrally projects The rear portion of the pipe b is bent downward so that the pipe has a laterally-directed L-like shape in side view.

FIG. 16 shows another example of an air vent structure used in the prior art. In this example, a pipe d projects rearward from a lamp body c in a straight manner. The upper end of a waterproof tube e, which has a laterally-directed U-like shape in side view, is fitted onto the rear end of the pipe d.

However, the lamp shown in FIG. 15 has problems in that slide molds are required in the molding process used to produce the lamp body, and that it is difficult to test the airtightness of the lamp apparatus.

The above problems will be described more specifically. Assuming that the molds for the lamp body a open in forward and rearward directions, since the pipe has an L-like shape, a core which slides in a direction perpendicular to the mold opening direction must be used in the process used for molding the pipe b. This makes the molds complicated in structure, and hence causes the production cost to be increased.

In order to test for airtightness, all openings in the lamp body must be closed, other than the opening through which air for pressurizing the interior of the lamp housing (usually the bulb mounting hole is used for this purpose). In the lamp shown in FIG. 15, the pipe b opens downward. Therefore, a member for closing the opening of the pipe must be firmly fitted into the opening from underneath, thereby producing a problem in that such an operation is difficult to perform. Particularly, the fact that the work of closing the opening of the pipe b cannot be conducted from directly behind the lamp makes automatization of the airtightness test very difficult.

In the vehicular lamp shown in FIG. 16, a waterproof tube e having a complicated structure is required, and hence the number of parts is increased. Furthermore, the waterproof tube e has a laterally-directed U-like shape in side view. This produces a problem in that, when the tube is attached to the pipe d, the resulting air vent structure has overall a large size.

SUMMARY OF THE INVENTION

In order to solve the problems discussed above, a vehicular lamp of the invention comprises a lamp body which defines a lamp housing and which is made of a synthetic resin, the lamp body being configured in such a manner that an integrally formed tubular wall projects rearward from a rear wall of the lamp body, a communicating hole through which a space surrounded by the tubular wall is communicated with the interior of the lamp body is formed in the rear wall, and a rear edge of the tubular wall is in a single plane which is inclined downward in the forward direction.

According to the invention, therefore, the rear edge, i.e., the opening of the tubular wall, is directed substantially rearward. It is easy to closely fit a member for closing the opening to the opening, and, as a result, the airtightness of the lamp housing can easily be tested. Particularly, the airtightness test can easily be automated.

Unlike the prior art approach, it is not required to attach a U-like waterproof tube to the lamp apparatus body. Consequently, it is not necessary to increase the size of the air vent structure.

DESCRIPTION OF THE PREFERRED EMBODIMENTS

Figure 1:
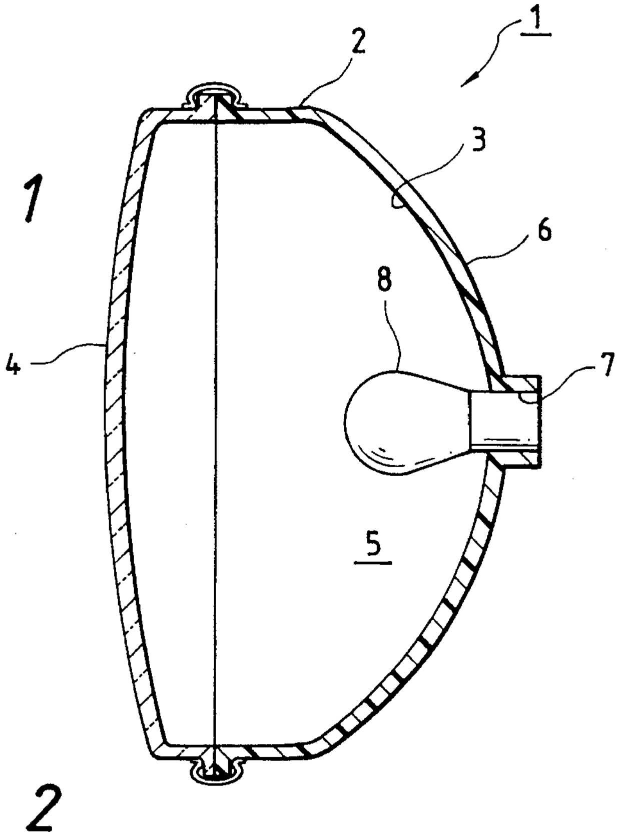
FIG. 1 is a longitudinal section view of a first embodiment of a vehicular lamp of the invention.
Figure 2:
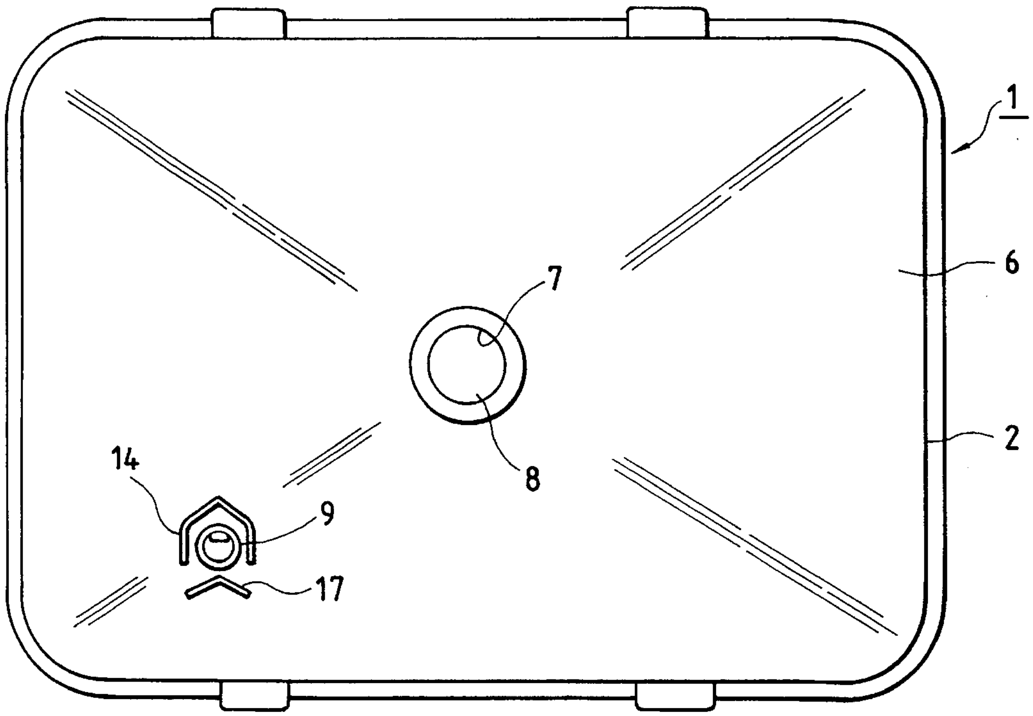
FIG. 2 is a rear view of the lamp of the first embodiment.
Figure 3:
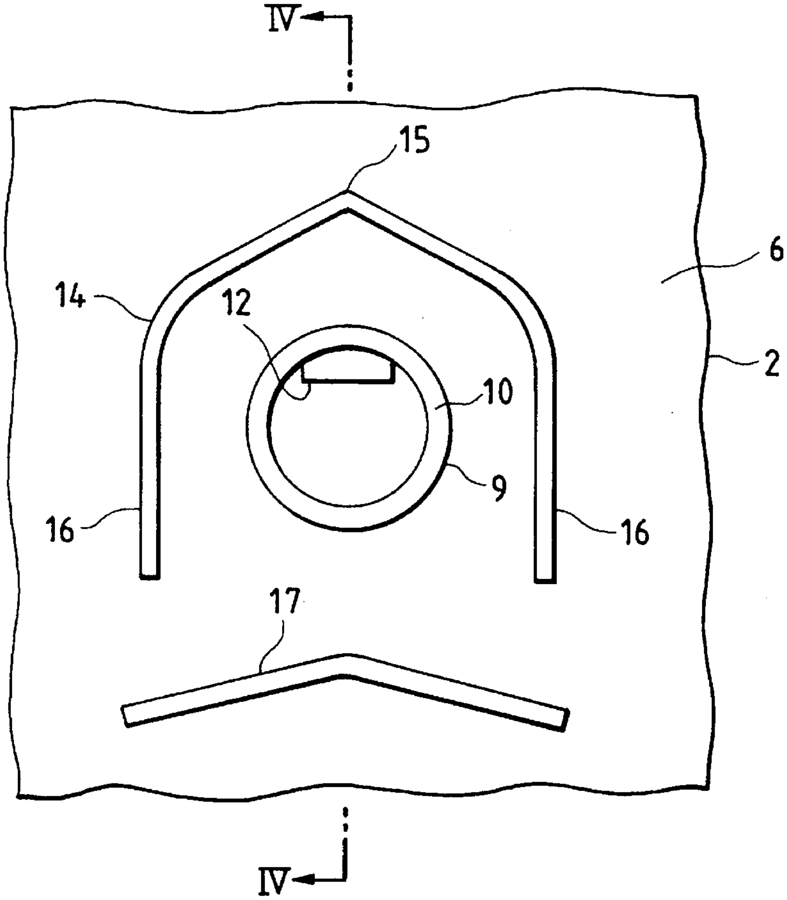
FIG. 3 is an enlarged rear view showing main portions of the lamp of FIG. 1.

Hereinafter, the invention will be described in detail with reference to preferred embodiments shown in the drawings.

FIGS. 1 to 6 show a first embodiment 1 of a lamp apparatus for a vehicle of the invention.

The reference numeral 2 designates a lamp apparatus body which is made of a synthetic resin. The lamp apparatus body has an opening 3 which opens forward. The front face of the recess 3 is closed by a lens 4 to define a lamp housing 5. A bulb 8 is mounted in a bulb mounting hole 7 formed in a rear wall 6.

Reference numeral 9 designates a tubular wall which is integrally formed on the rear wall 6 so as to project rearward therefrom, the tubular wall 9 having a substantially cylindrical shape. The rear edge 10 of the tubular wall 9 is inclined downward in the forward direction in the direction of the rear wall 6. That is, the plane including the rear edge 10 is inclined downward in the forward direction.

Reference numeral 11 designates a communicating hole formed in the upper end of the portion of the rear wall 6, which portion is surrounded by the tubular wall 9. The interior and exterior of the lamp housing 5 are communicated with each other through the communicating hole 11. The upper edge of the communicating hole 11 coincides in level with the corresponding portion of the upper inner face of the tubular wall 9.

Reference numeral 12 designates a water barrier wall which projects vertically from the position of the upper inner face of the tubular wall 9 near the front end of the wall. The water barrier wall is substantially coincident in size with the communicating hole 11. The lower edge of the water barrier wall 12 is at a level equal to or slightly higher than the level of the lower edge of the communicating hole 11.

Reference numeral 13 designates side walls which connect the side edge of the communicating hole 11 with the side edge of the water barrier wall 12. The distance between the side walls 13 at the rear end is equal to or slightly smaller than that at the front end. The lower edges of the side walls 13 are at the same level as or slightly higher than the lower end of the side edge of the communicating hole 11.

The positional relationships between the portions of the communicating hole 11, and those of the water barrier wall 12 and the side walls 13 are set as described above because of the following reason. In the process of molding the lamp apparatus body 2, the molds can be opened in the forward and rearward directions, and hence the water barrier wall 12 and the side walls 13 can be formed without using slide molds.

The interior and exterior of the lamp housing 5 are communicated with each other through the communicating hole 11, and the tubular wall 9 surrounds the communicating hole 11. This arrangement prevents water, such as rainwater or splashed water from a car wash, from entering the lamp housing 5 through the communicating hole 11. Since the rear edge of the tubular wall 9 is inclined downward in the forward direction, ingress of water from above is effectively prevented. The configuration in which the rear edge of the tubular wall 9 is inclined downward in the forward direction allows the area of the opening to be increased, thereby attaining the effects that the interior is well communicated with the exterior, fogging due to dew condensation on the inner face of the lens is prevented, and the lamp body is prevented from being deformed by a temperature rise due to heat generated by the bulb.

Even if water enters the interior of the tubular wall 9, the flow of the water is blocked by the water barrier wall 12 and the side walls 13 so that the water is prevented from entering the lamp housing 5 through the communicating hole 11. This eliminates the necessity of extra elements, such as a waterproof tube, which are required in the prior art. Thus, the number of parts can be reduced.

Figure 4:
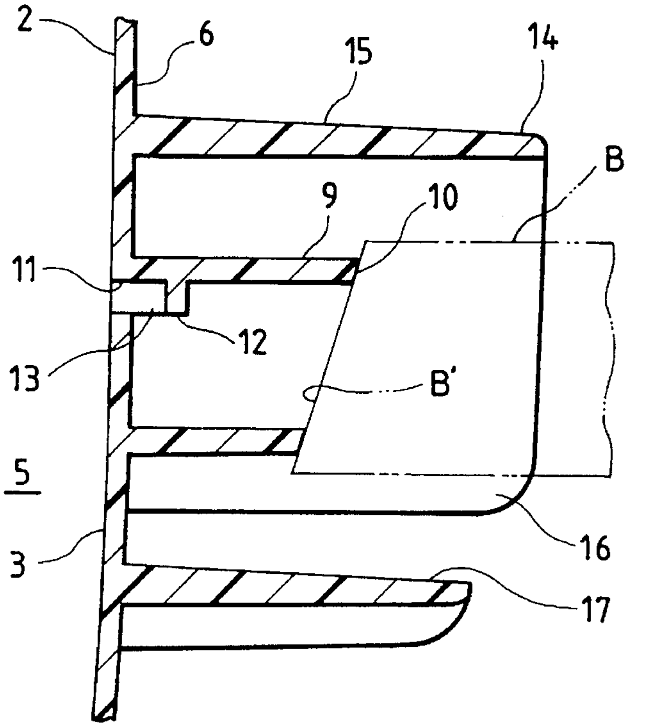
FIG. 4 is a section view taken along a line IV—IV in FIG. 3.

When the airtightness of the lamp housing 5 is to be tested, a bushing B made of an elastic material such as rubber is pressed from behind against the rear edge 10 of the tubular wall 9, as shown by a two-dot chain line in FIG. 4, so that the rear end of the tubular wall 9 is closed, thereby improving the workability of the airtightness test. As shown in FIG. 4, the bushing B may have an inclined front end face B', and the inclination of the front end face may be equal to that of the rear edge 10 of the tubular wall 9. In this case, the force of pressing the front end face B' is applied directly in the forward direction. Consequently, the airtightness test can be easily automated.

The tubular wall 9 has a cylindrical shape. The tubular wall is not restricted to a cylindrical shape, and may have any shape such as a rectangular cylinder-like shape.

Figure 5:
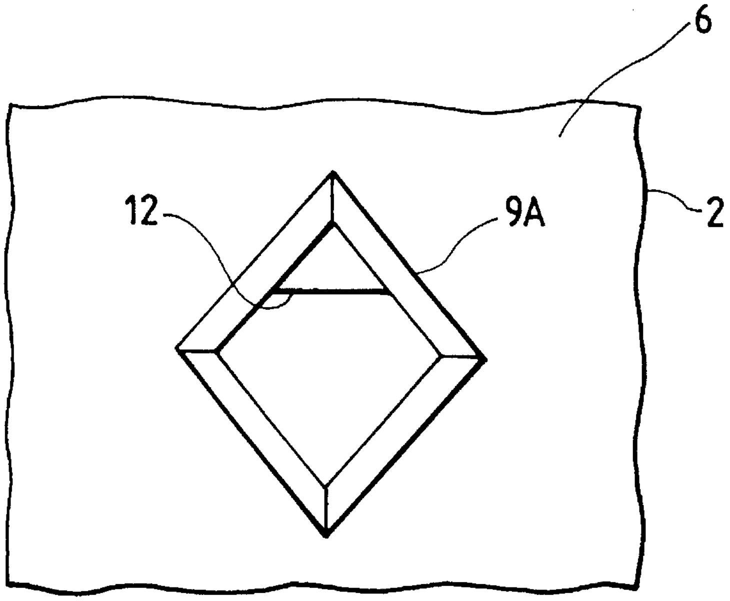
FIG. 5 is a rear view showing a modification of a tubular wall of the lamp of FIG. 1.

In order to collect water at the lower end, for example, a tubular wall 9A having a rectangular cylinder-like shape may be used as shown in FIG. 5. If the tubular wall is formed in such a manner that one of the corners constitutes the lower end of the tubular wall, water entering the tubular wall 9A tends to collect at the lower end so as to be easily discharged. Furthermore, moisture contained in the air easily condenses at the lowest corner.

Reference numeral 14 designates a hood wall which projects from the rear wall 6 of the lamp apparatus body 2 so as to cover the upper and side portions of the tubular wall 9. The upper portion 15 of the hood wall 14 has an L-like shape as seen from behind, and the side portions 16 extend straight downward from the right and left side ends of the upper portion 15. The lower ends of the side portions terminate at a level which is substantially the same as that of the lower end of the tubular wall 9. The rear end of the hood wall 14 is located at a position further rearward than the rear end of the tubular wall 9. The length of the hood wall 14 which projects from the rear wall 6 is about two times the projection length of the tubular wall 9.

The provision of the hood wall 14 substantially completely prevents water from entering from above and reaching the tubular wall 9, thereby enhancing the waterproofing property of the lamp housing 5. Even if the lower face of the hood wall 14 is wetted, water flows toward the side portion along the L-like lower face of the hood wall 14 so that the water is prevented from dropping on the tubular wall 9.

Reference numeral 17 designates a waterproof wall which projects from the rear wall 6 of the lamp apparatus body 2 so as to cover the lower portion of the tubular wall 9. The waterproof wall has a substantially L-like shape as seen from behind. The length of the waterproof wall 17 which projects from the rear wall 6 is slightly smaller than two times the projection length of the tubular wall 9.

The waterproof wall 17 blocks water splashed, for example, from beneath so that the water is prevented from entering the interior of the tubular wall 9. Even if water reaches the upper portion of the waterproof wall 17, the L-like shape of the waterproof wall 17 causes the water to quickly flow down and drip off the wall.

Figure 6:
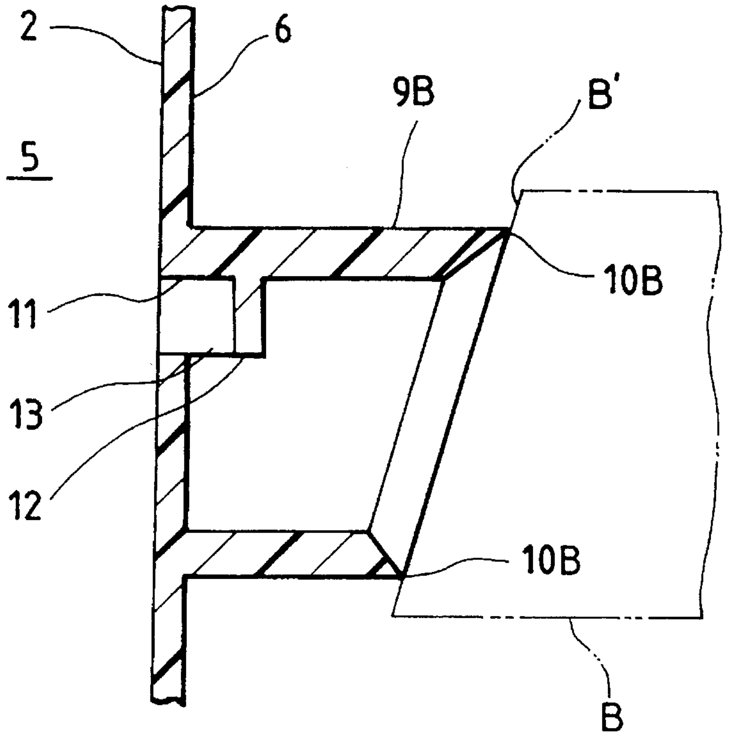
FIG. 6 is a rear view showing another modification of the tubular wall.

FIG. 6 shows a modification 9B of the tubular wall. In order to improve the sealing property during the airtightness test, the inner face of the rear end of the tubular wall is inclined so that the rear edge 10B has a wedge-like shape.

When the bushing B is closely contacted with the rear edge 10B, this configuration enables the rear edge 10B to easily bite into the front end face B' of the bushing B, thereby enhancing the airtightness of this portion.

Figure 7:
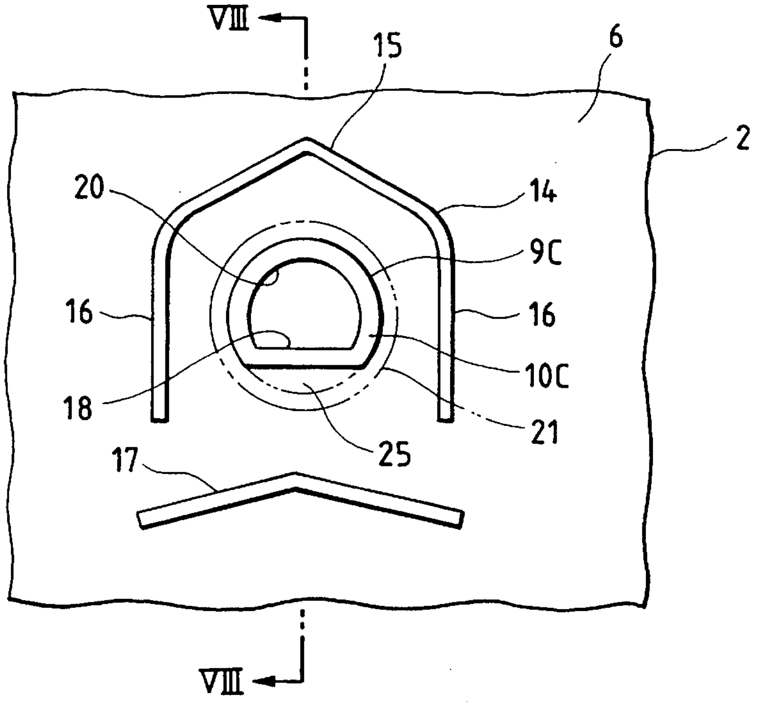
FIG. 7 is an enlarged rear view showing main portions of a lamp of a second embodiment of the invention.
Figure 8:
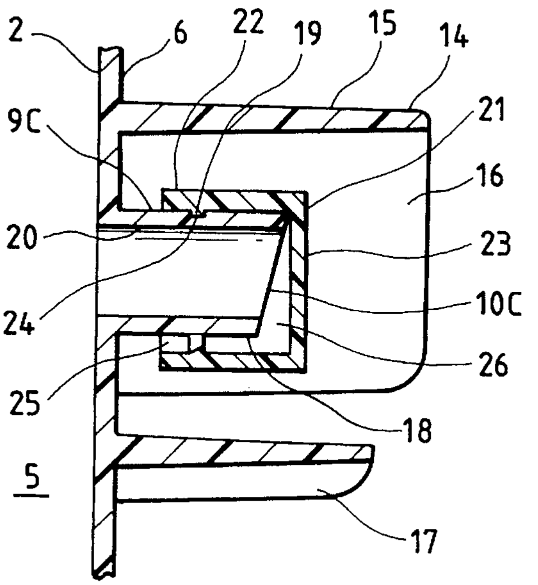
FIG. 8 is a section view taken along a line VIII—VIII in FIG. 7.
Figure 9:
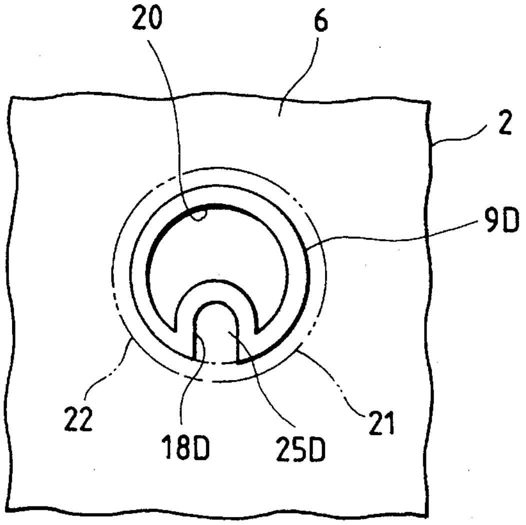
FIG. 9 is a rear view showing a modification of a tubular wall in the lamp of FIG. 7.
Figure 10:
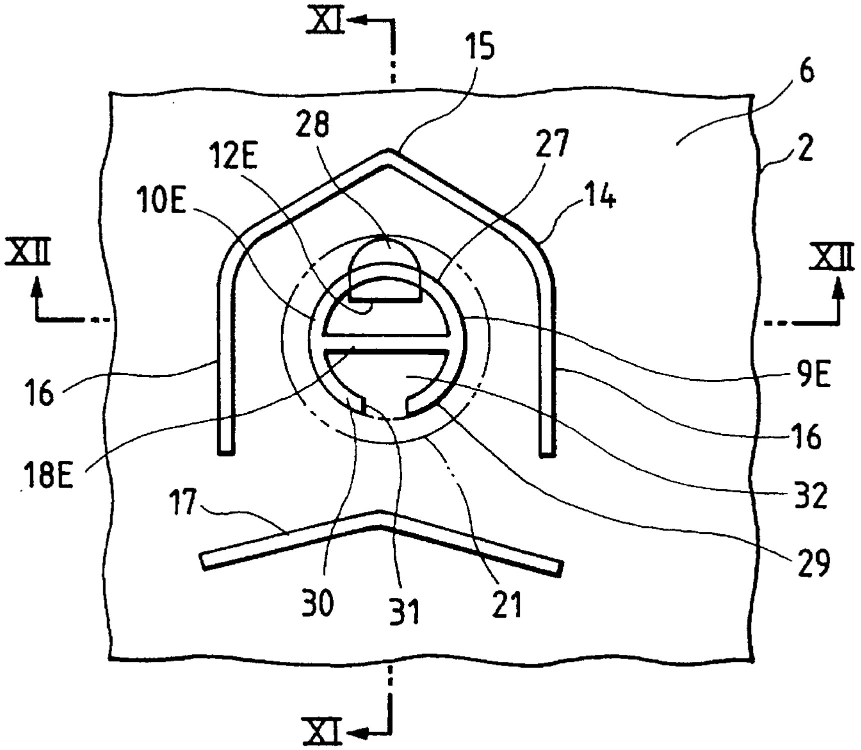
FIG. 10 is a rear view showing main portions of a lamp of a third embodiment of the invention.
Figure 11:
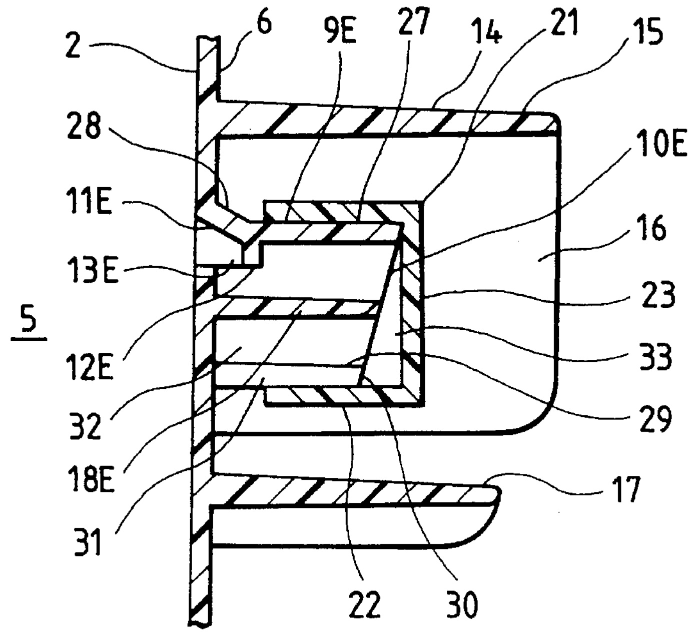
FIG. 11 is a section view taken along a line XI—XI in FIG. 10.
Figure 12:
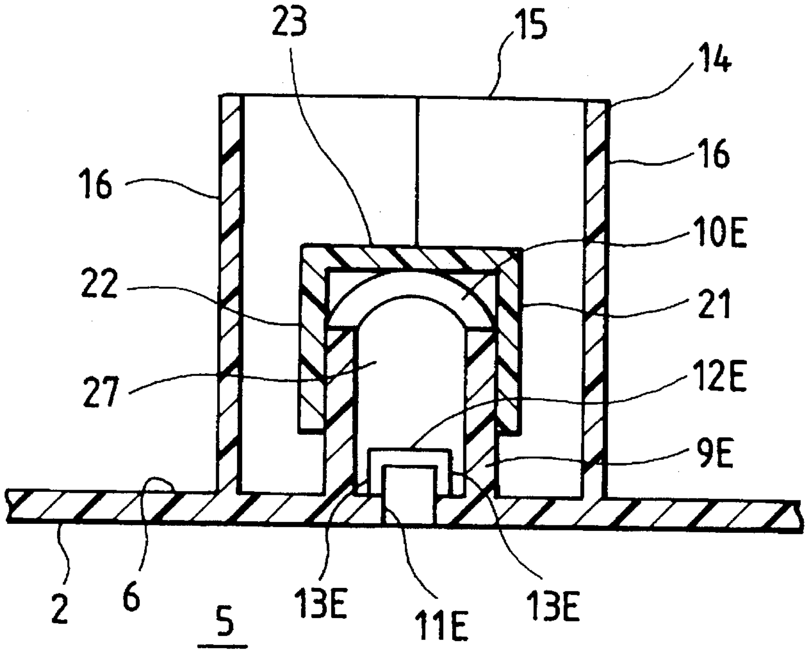
FIG. 12 is a section view taken along a line XII—XII in FIG. 10.

FIGS. 7 to 9 show a second embodiment of a vehicular lamp of the invention.

A tubular wall 9C has a lower face portion 18 which is formed into a flat plate-like shape. Also, the rear edge 10C of the tubular wall 9C is inclined downward in the forward direction.

Reference numeral 19 designates an engaging groove formed in a portion of the outer face of the tubular wall 9C other than the lower face portion 18 and which extends along the circumference.

Reference numeral 20 designates a communicating hole formed in the rear wall 6 of the lamp apparatus body 2, extending over the entire portion of the rear wall 6 surrounded by the tubular wall 9C.

Reference numeral 21 designates a cap made of a synthetic resin which is slightly elastic. The cap 21 has a tubular portion 22 of a substantially cylindrical shape, and a closing wall 23 which covers one end of the tubular portion 22. The tubular portion and the closing wall are integrated into one unit. An engaging ridge 24 projects from the inner face of the tubular portion 22 and extends along the circumference. The closing wall 23 extends substantially perpendicular to the axis of the tubular portion 22.

Reference numeral 14 designates a hood wall, and 17 designates a waterproof wall. The two components are the same as those of the first embodiment.

The tubular portion 22 of the cap 21 is fitted onto the tubular wall 9C. At this time, the engaging ridge 24 formed on the tubular portion 22 of the cap 21 engages with the engaging groove 19 formed in the tubular wall 9C. As a result, the cap 21 is tightly fitted to the tubular wall 9C so that it cannot easily be removed therefrom.

The difference in shape between the tubular wall 9C and the tubular portion 22 fitted onto the wall provides for the formation of a gap 25 between the lower face portion 18 of the tubular wall 9C and the lower portion of the tubular portion 22. Furthermore, the combination of the forward and downward inclination of the rear edge 10C of the tubular wall 9C, and the perpendicularity of the closing wall 23 of the cap 21 with respect to the axis of the tubular portion 22 forms a gap 26 between the rear edge of the lower face portion 18 of the tubular wall 9C and the closing wall 23. The interior and exterior of the lamp housing 5 are communicated with each other through the gaps 25 and 26, the tubular wall 9C, and the communicating hole 20. This configuration provides the path communicating the interior and exterior of the lamp housing 5 with a complex labyrinth structure, whereby the waterproof property is improved.

FIG. 9 shows a modification 9D of the tubular wall.

The lower face portion 18D of the tubular wall 9D arches upward so as to have a substantially semicircular shape as seen from behind, so that the cap 21 can be stably fixed to the tubular wall 9D. Therefore, a substantially semicylindrical gap 25D is formed between the lower face portion 18D and the lower portion of the tubular portion 22 of the cap 21. It is a matter of course also that the rear edge of the lower face portion 18D is located in the same plane as the rear edge of the tubular wall 9D. This configuration enables the airtightness test to be conducted easily. Since the lower face portion 18D has a substantially semicircular shape, the contact area between the tubular portion 22 of the cap 21 and the tubular wall 9D can be increased while providing a gap 25D having the same sectional area as that of the gap 25 in the example shown in FIGS. 7 and 8. Consequently, the attachment of the cap 21 is stabilized.

FIGS. 10 to 14 show a third embodiment of a vehicular lamp of the invention.

A tubular wall 9E has a lower face portion 18E which is formed into a flat plate-like shape, and another portion 27 which is formed into a semicylindrical shape. The base of the semicylindrical portion 27, i.e., the portion 28 in the side of the rear wall 6, has a tapered shape which slightly expands outward so as to provide for the area required for a communicating hole 11E. This configuration allows the communicating hole 11E to have a large area, and hence water on the inner face of the taper portion 28 can quickly flow out along the slope of the taper face. The rear edge 10E of the tubular wall 9E is inclined downward in the forward direction, Reference numeral 11E designates a communicating hole formed in the upper end of the portion of the rear wall 6 surrounded by the tubular wall 9E. The interior and exterior of the lamp housing 5 are communicated with each other through the communicating hole 11E. The upper edge of the communicating hole 11E coincides in level with the corresponding portion of the upper inner face of the tubular wall 9E.

Reference numeral 12E designates a water barrier wall which projects downward from the position of the upper inner face of the tubular wall 9E near the front end of the wall. The water barrier wall is substantially coincident in size with the communicating hole 11E. The lower edge of the water barrier wall 12E is at a level equal to or slightly higher than the level of the lower edge of the communicating hole 11E.

Reference numeral 13E designates side walls which connect the side edge of the communicating hole 11E with the side edge of the water barrier wall 12E. The distance between the side walls 13E at the rear end is equal to or slightly smaller than that at the front end. The lower edges of the side walls 13E are at the same level as or slightly higher than the lower end of the side edge of the communicating hole 11E.

The positional relationships between the portions of the communicating hole 11E and those of the water barrier wall 12E and the side walls 13E are set as described above because in the process of molding the lamp apparatus body 2, the molds can be opened in the forward and rearward directions, and hence the water barrier wall 12E and the side walls 13E can be formed without using slide molds.

A cover wall 29 which has a semicylindrical shape is formed below the lower face portion 18E of the tubular wall 9E. The upper end of the cover wall 29 is continuous with both side ends of the lower face portion 18E, and the front end of the wall is coincident with the rear wall 6. Therefore, the combination of the cover wall 29 and the semicylindrical portion 27 of the tubular wall 9E has a substantially semicylindrical outer shape.

The rear edge of the cover wall 30, which is inclined downward in the forward direction, is located in the same plane as the rear edge 10E of the tubular wall 9E. In other words, the rear edge 30 is an inclined edge which is continuous with the rear edge 10E of the tubular wall 9E. Alternatively, the rear edge 30 may be located at a position more forward than the rear edge 10E of the tubular wall 9E.

Reference numeral 31 designates a notch which is formed in the center portion of the cover wall 29, i.e., the lowest portion. The notch reaches the rear end.

The tubular portion 22 of the cap 21 is fitted onto the tubular wall 9E. The tubular portion 22 having a cylindrical shape is substantially closely fitted onto the cylindrical portion formed by the tubular wall 9E and the cover wall 29. The interior and exterior of the lamp housing 5 are communicated with each other through the front portion of the notch 31 of the cover wall 29 which portion is not covered by the tubular portion 22 of the cap 21, a gap 32 between the cover wall 29 and the lower face portion 18E, a gap 33 between the rear edge of the lower face portion 18E and the closing wall 23 of the cap 21, the tubular wall 9E, and the communicating hole 11E.

Figure 16:
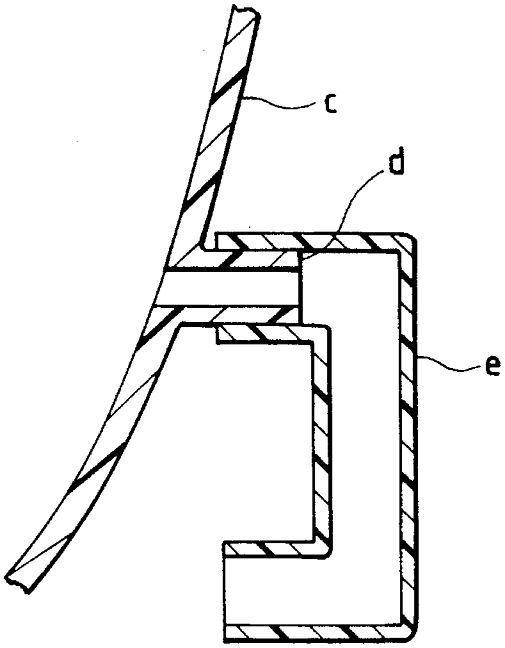
FIG. 16 PRIOR ART
FIG. 16 is a section view showing another example of a vehicular lamp of the prior art.

The gap 32 is formed irrespective of the direction of attachment of the cap 21. Unlike the U-like waterproof tube e in the prior art shown in FIG. 16, the cap can be attached without attention being paid to the direction of attachment, thereby simplifying the assembling process.

Reference numeral 14 designates a hood wall, and 17 designates a waterproof wall. The two components are the same as those of the first embodiment.

Figure 13:
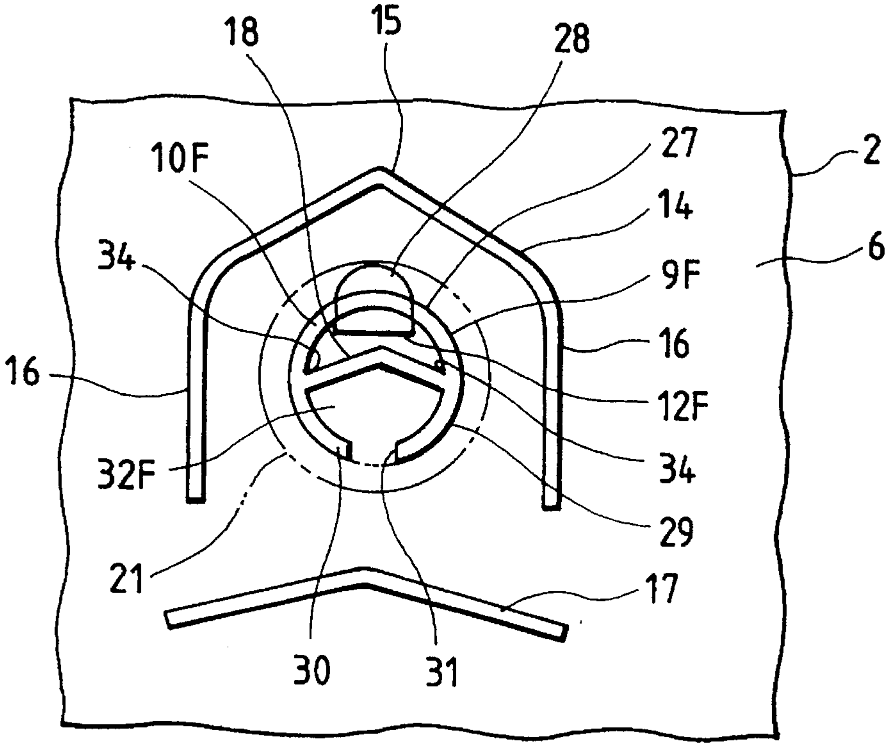
FIG. 13 is a rear view showing a modification of a tubular wall in the lamp of FIG. 10.

FIG. 13 shows a modification 9F of the tubular wall in which the waterproof property is further improved. In the modification, a lower wall 18F has an L-like shape as seen from behind. This configuration causes grooves 34 having a substantially V-like section to be formed between the ends of the lower wall 18F and those of the semicylindrical portion 27, so that moisture contained in the air, entering water drops, etc., are easily discharged. This prevents water from collecting in the center portion of the lower wall 18F, thereby improving the waterproofing property.

Figure 14:
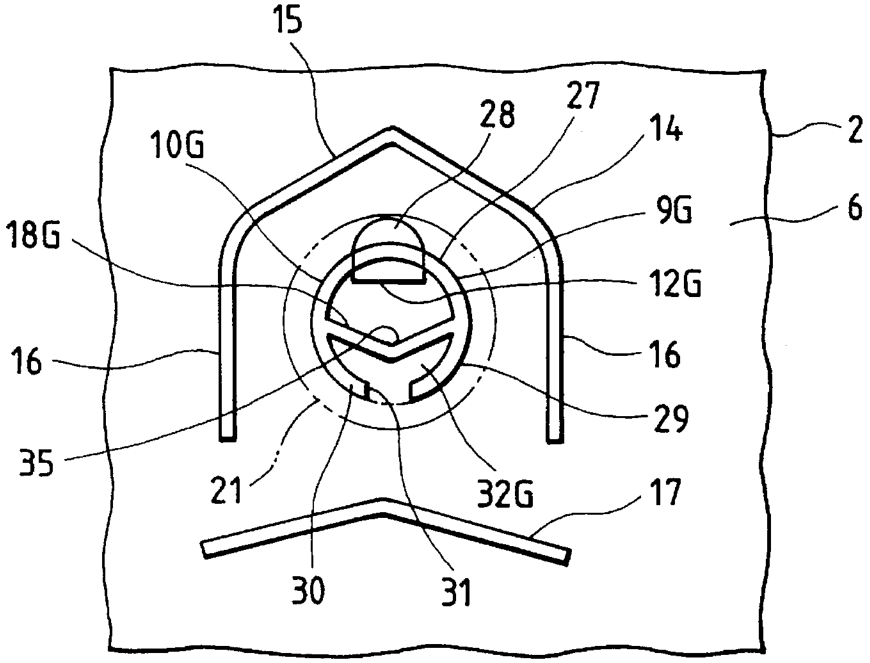
FIG. 14 is a rear view showing another modification of the tubular wall.
Figure 15:
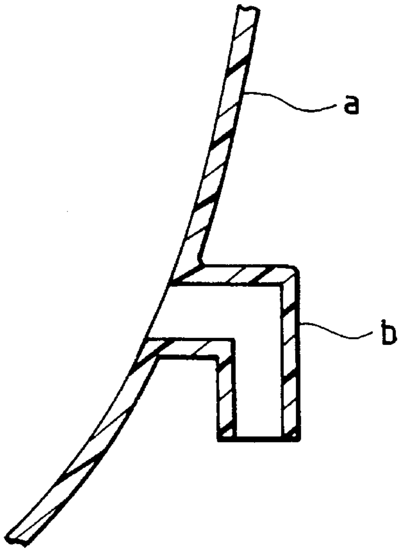
FIG. 15 PRIOR ART
FIG. 15 is a section view showing main portions of an example of a vehicular lamp of the prior art.

FIG. 14 shows another modification 9G of the tubular wall. In this modification, a lower wall 18G has an inverted L-like shape. According to this configuration, a groove 35 having a V-like section is formed in the center portion of the lower wall 18G so that moisture contained in the air, entering waterdrops, etc., are easily discharged. Since the distance between the lower wall 18G of the tubular wall 9G and the communicating hole is increased, furthermore, it is difficult for water to enter the communicating hole.

As seen from the above description, the vehicular lamp of the invention includes a lamp body made of a synthetic resin, and is characterized in that an integrally formed tubular wall projects from a rear wall of the lamp body, a communicating hole through which a space surrounded by the tubular wall is communicated with the interior of the lamp apparatus body is formed in the rear wall, and the rear edge of the tubular wall lies in a single plane which is inclined downward in a forward direction.

In the vehicular lamp of the invention, therefore, the rear edge, i.e., the opening of the tubular wall, is directed substantially rearward. It is therefore easy to closely fit a member for closing the opening to the opening, and the airtightness of the lamp housing can easily be tested. Particularly, the airtightness test can easily be automatized.

Unlike the prior art, it is not required to attach a U-like waterproof tube to the lamp apparatus body. Consequently, the air vent structure itself is prevented from being increased in size.

The specific shapes and structures of the various components of the embodiments described are shown only as examples for embodying the invention. The scope of the invention should not be interpreted to be restricted to these examples.

What is claimed is:

1. A vehicular lamp comprising: a lamp body defining a lamp housing, said lamp body being made of a synthetic resin, and a continuous tubular wall formed integrally with said lamp body and projecting from a rear wall of said lamp body, said rear wall having a communicating hole through which a space defined by said tubular wall is communicated with the interior of said lamp apparatus body being formed in said rear wall, and a rear edge of said continuous tubular wall being continuous and lying in a single plane inclined downward in a forward direction.

2. The vehicular lamp according to claim 1, further comprising a cap fitted on a rear end of said tubular wall, said cap comprising a tubular portion fitted on said tubular wall, and a closing wall which closes a rear end of said tubular portion, said closing wall extending in a direction substantially perpendicular to a longitudinal axis of said tubular portion, and a lower face of said tubular wall having a shape cooperating with an inner face of said rear end of said tubular portion of said cap to form a gap, whereby a gap formed between said closing wall of said cap and a rear edge of said tubular wall and said gap formed between said inner face of said rear end of said tubular portion of said cap and said lower face of said tubular wall are communicated with said communicating hole.

3. The vehicular lamp according to claim 1, further comprising: a cover wall covering a lower end portion of said tubular wall from underneath, a rear end of said cover wall lying in or in front of said single plane, said cover wall having formed therein a notch which opens on a rear end of said tubular wall; a cap fitted on said rear end of said tubular wall, said cap comprising a tubular portion fitted onto a portion of said tubular wall excluding a lower face of said tubular wall and also onto said cover wall; and a closing wall closing a rear end of said tubular portion, said closing wall extending in a direction substantially perpendicular to a longitudinal axis of said tubular portion, said tubular portion having a shape which does not completely cover said notch of said cover wall, and said notch communicating with said communicating hole through a gap formed between said closing wall of said cap and said rear edge of said tubular wall.

4. The vehicular lamp according to claim 1, further comprising a water barrier wall covering a front portion of said communicating hole, said water barrier wall being formed in said tubular wall, a lower edge of said water barrier wall being at a level equal to or slightly higher than a level of a lower edge of said communicating hole.

5. The vehicular lamp according to claim 4, further comprising a side wall which connects a side edge of said water barrier wall and said rear wall of said lamp apparatus body, a lower edge of said side wall being at the same or a slightly higher level than a lower edge of said communicating hole.

6. The vehicular lamp according to claim 1, further comprising a hood wall formed integrally with and projecting rearward from a first portion of said rear wall of said lamp body, said first portion being above said tubular wall, and a waterproof wall formed integrally with and projecting rearward from a second portion of said rear wall of said lamp body, said second portion being below said tubular wall, projection lengths of said hood wall and said waterproof wall from said rear wall being greater than a projection length of said tubular wall from said rear wall.

7. The vehicular lamp according to claim 4, further comprising a hood wall formed integrally with and projecting rearward from a first portion of said rear wall of said lamp body, said first portion being above said tubular wall, and a waterproof wall formed integrally with and projecting rearward from a second portion of said rear wall of said lamp body, said second portion being below said tubular wall, projection lengths of said hood wall and said waterproof wall from said rear wall being greater than a projection length of said tubular wall from said rear wall.

8. The vehicular lamp according to claim 5, further comprising a hood wall formed integrally with and projecting rearward from a first portion of said rear wall of said lamp body, said first portion being above said tubular wall, and a waterproof wall formed integrally with and projecting rearward from a second portion of said rear wall of said lamp body, said second portion being below said tubular wall, projection lengths of said hood wall and said waterproof wall from said rear wall being greater than a projection length of said tubular wall from said rear wall.

* * * * *